No. 839,947.

PATENTED JAN. 1, 1907.

F. McCLUSKEY.
TENSION JOINT FOR PIPES.
APPLICATION FILED DEC. 9, 1905.

Witnesses
Edward Rowland
Kathryn Cheevers

Frank McCluskey
Inventor
By his Attorney A. H. Mackaye

UNITED STATES PATENT OFFICE.

FRANK McCLUSKEY, OF NEW YORK, N. Y.

TENSION-JOINT FOR PIPES.

No. 839,947.  Specification of Letters Patent.  Patented Jan. 1, 1907.

Application filed December 9, 1905. Serial No. 291,019.

*To all whom it may concern:*

Be it known that I, FRANK McCLUSKEY, a citizen of the United States, residing in the city of New York, county and State of New York, have invented a certain new and useful Improvement in Tension-Joints for Pipes, of which the following is a specification.

This invention has relation to means for joining sections of pipe intended for subaqueous location, where the couplings, in addition to maintaining water and gas tight joints, must be capable of resisting great tension both while the line of joined pipes is being dragged into place and afterward as it hangs under water suspended from its two ends.

The improved joint herein described and claimed has the advantage of meeting the above conditions without detriment to that elasticity which is essential in piping, which must assume a curve or catenary as it hangs.

The invention is illustrated in the accompanying drawings, wherein—

Figure 1:
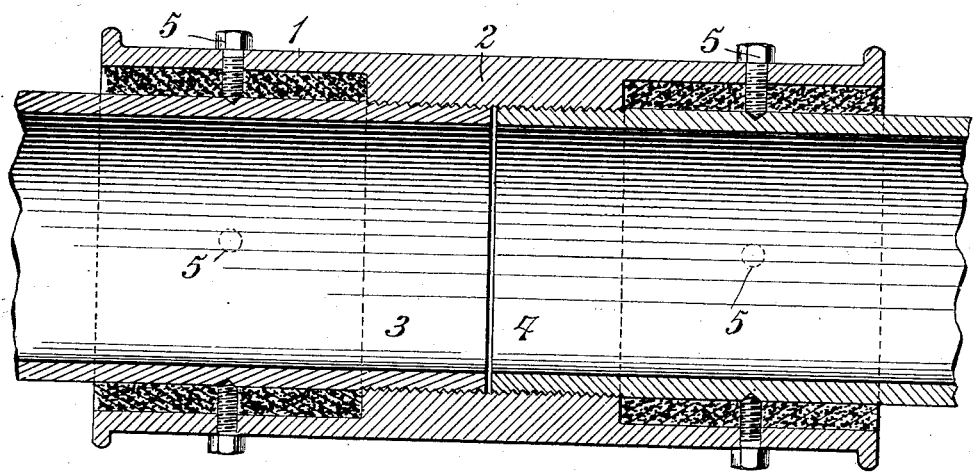
Figure 2:
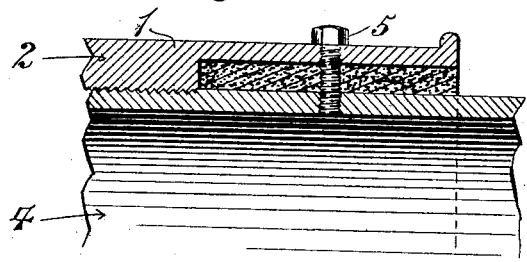

Figure 1 is a median longitudinal section through two abutting pipe-sections united by the improved joint or coupling, and Fig. 2 is a partial sectional view showing a modification.

As an article of manufacture the improved joint or coupling conisists of a strong malleable-iron sleeve 1, having an interior thickened portion 2, which is threaded to fit over the ends of the abutting pipes 3 and 4, which ends are correspondingly threaded to receive said sleeve. The outer thinner ends of the sleeve are perforated to receive screws or bolts 5. These bolts in the form shown in Fig. 1 have conical ends and are intended to find a seat on the outside of the pipes 3 and 4. These may be such as are produced by a center punch. They are threaded into the pipe 1, and in the form shown there are four such bolts for each end of the sleeve 1.

In making the joint the threaded ends of the pipes 3 and 4 are first screwed into opposite ends of the thickened portion 2 of the sleeve 1 until the ends of said pipes are brought close together or actually abut. The bolts 5 are then applied and screwed firmly home. Lead is then poured into the open annular spaces left under the two ends of the sleeve 1 and between the same and the pipes 3 and 4. The effect of the lead is to secure tightness of the joints and at the same time coöperate with the bolts 5 to relieve the threads on the pipe ends from the excessive strain otherwise brought upon them by the drag necessarily applied to the pipe-line.

Where extra strength is required, the bolts 5 can be threaded into proper cavities in the pipe-walls and, if desired, can be carried all the way through said walls. This is shown in Fig. 2, and it is to be understood that the present invention covers the use of bolts 5 whether threaded into the pipes 3 and 4 or not.

What I claim is—

1. A tension-joint for pipes comprising a sleeve having a middle portion threaded onto the abutting ends of two pipe-sections and also having two end portions of large diameter, integral lead cushions molded into the end portions of said sleeves and bolts for retaining said cushions passing through the ends of said sleeves and into said cushions, substantially as described.

2. A tension-joint for pipes comprising a sleeve having a middle portion threaded onto the abutting ends of two pipe-sections and also having two end portions of large diameter, bolts passing through said end portions into said pipe-sections for aiding the threads to support tensional strain and lead cushions molded into said sleeve ends and around said bolts so as to be retained thereby, substantially as described.

3. A tension-joint for pipes comprising a sleeve having substantially uniform exterior diameter and thickened at the middle where it is threaded onto the abutting ends of two pipe-sections, bolts passing through its end portions into said pipe-sections for aiding the threads to support tensional strain and lead cushions molded into the sleeve ends and around said bolts so as to be retained thereby, substantially as described.

FRANK McCLUSKEY.

Witnesses:
H. S. MACKAYE,
KATHRYN B. CHEEVERS.